United States Patent
Akagi et al.

[11] Patent Number: 6,158,802
[45] Date of Patent: Dec. 12, 2000

[54] SWITCH MOUNTING STRUCTURE IN A VEHICLE

[75] Inventors: Hiroomi Akagi; Tatsuo Matsuura, both of Wako, Japan

[73] Assignee: Honda Giken Kogyo Kabushiki Kaisha, Tokyo, Japan

[21] Appl. No.: 09/190,479

[22] Filed: Nov. 12, 1998

[30] Foreign Application Priority Data

Nov. 13, 1997 [JP] Japan .................................. 9-311815

[51] Int. Cl.[7] .................................................. B60R 13/02
[52] U.S. Cl. ........................ 296/214; 296/39.1; 248/27.3; 200/296
[58] Field of Search .................................. 296/214, 39.1, 296/1.1; 248/27.1, 27.3, 904; 200/295, 296; 439/536, 537, 538

[56] References Cited

U.S. PATENT DOCUMENTS

| | | | |
|---|---|---|---|
| 2,023,719 | 12/1935 | Arrison | 296/1.1 |
| 3,708,642 | 1/1973 | Hollingsead et al. | 200/295 |
| 4,844,533 | 7/1989 | Dowd et al. | 296/214 |
| 4,893,867 | 1/1990 | Hilborn et al. | 296/214 |
| 5,383,815 | 1/1995 | Kiesel et al. | 296/214 X |
| 5,562,493 | 10/1996 | Ferrill et al. | 439/536 |
| 5,599,190 | 2/1997 | Willette | 439/536 X |
| 5,599,206 | 2/1997 | Slack et al. | 439/536 |
| 5,934,935 | 8/1999 | Kameyama | 439/535 |

*Primary Examiner*—D. Glenn Dayoan
*Assistant Examiner*—Patricia Engle
*Attorney, Agent, or Firm*—Carrier, Blackman & Associates, P.C.; Joseph P. Carrier; William D. Blackman

[57] ABSTRACT

A switch mounting bracket 8 including a bottom plate 9, a pair of legs 10 and a pair of flanges 11 on tip ends of the legs is accommodated in a space 7 defined between a lower surface of a roof panel 3 and an upper surface of a roof lining 1 by adhering the pair of flanges to the upper surface of the roof lining 1 at 15. A switch 2 inserted into the switch mounting bracket 8 through an opening $1_1$ in the roof lining 1 is fixed by bringing locking claws $18_1$ provided in a flange 18 of the switch 2 into engagement into locking bores $11_1$ defined in the flanges 11. With the above structure, when a shock is applied to the switch 2 mounted on a roof of a vehicle, damage to the switch can be suppressed to a minimum because the switch does not contact the roof panel, and the alignment of the opening $1_1$ in the roof lining and the switch mounting bracket 8 can be easily performed because the components are directly joined together.

14 Claims, 5 Drawing Sheets

SWITCH MOUNTING STRUCTURE IN A VEHICLE

BACKGROUND OF THE INVENTION

1. Field of the Invention

The present invention relates to a structure for mounting a switch to a roof of a vehicle such as a recreational vehicle.

2. Description of the Related Art

Figure 5:
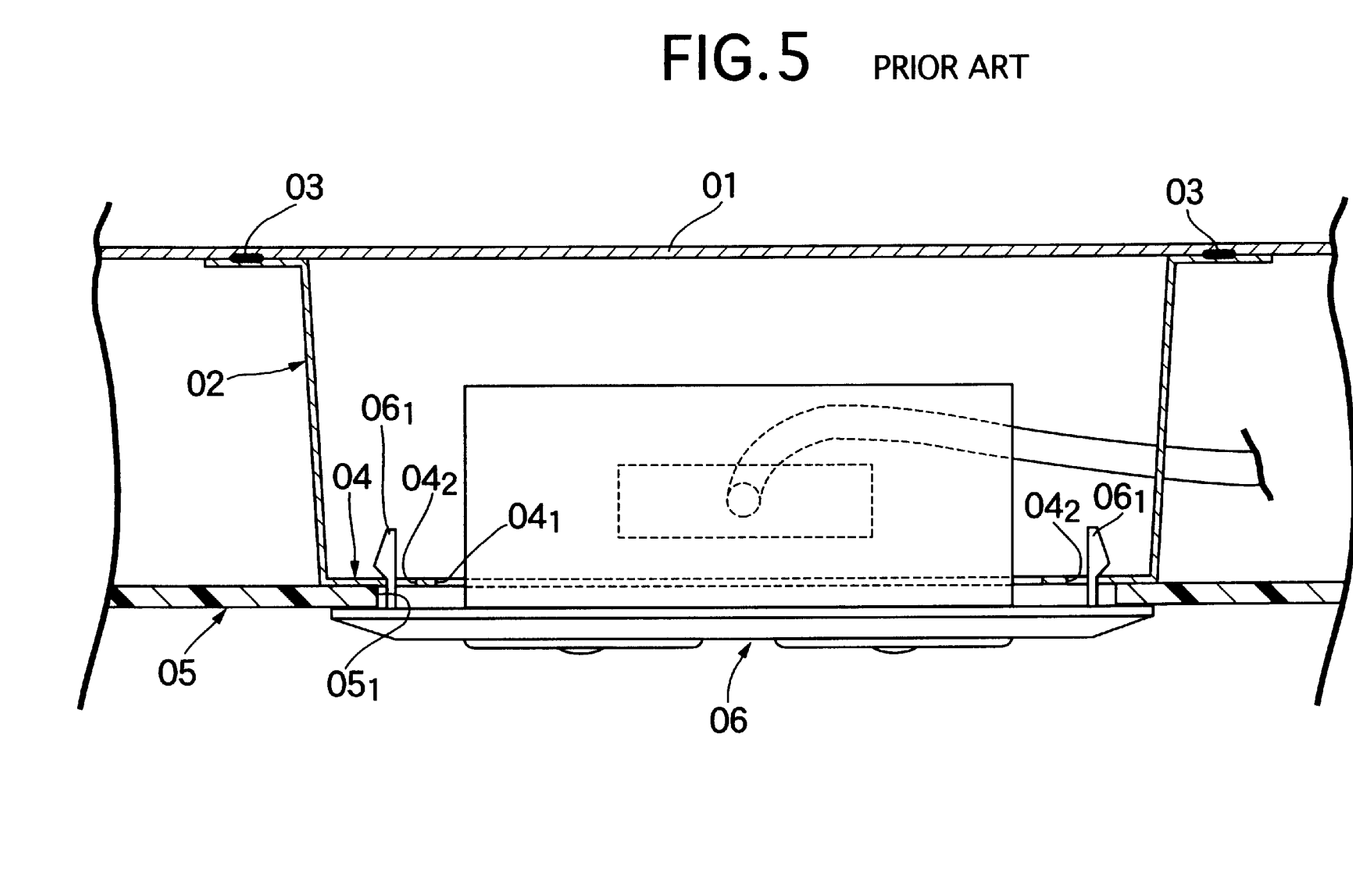
FIG. 5 is a sectional view similar to FIG. 3, but according to a conventional switch mounting structure.

FIG. 5 shows a conventional switch mounting structure. A switch mounting bracket 02 having an angular U-shaped section is fixed to a lower surface of a roof panel 01 of a vehicle by welding 03, 03, and an upper surface of a roof lining 05 is superposed onto a lower surface of a bottom plate 04 of the switch mounting bracket 02. In this state, a switch 06 is inserted into the switch mounting bracket 02 through an opening $05_1$ in the roof lining 05 and an opening $04_1$ in the bottom plate 04 of the switch mounting bracket 02. Then, locking claws $06_1$ provided on the switch 06 are brought into engagement with locking bores $04_2$ provided on the bottom plate 04, whereby the switch 06 is supported on the switch mounting bracket 02.

In the conventional switch mounting structure, the switch mounting bracket 02 is firmly fixed to the roof panel 01 and moreover, the switch mounting bracket 02 itself is of a highly rigid structure difficult to deform. For this reason, when a block of baggage in a vehicle compartment or the like collides with the switch 06, there is a possibility that a large shock is applied to the switch 06. When the roof lining 05 is mounted on the lower surface of the roof panel 01, a misalignment is liable to be produced between the switch mounting bracket 02 fixed to the roof panel 01 and the opening $05_1$ in the roof lining 05, and due to this, there is a possibility that the switch 06 is not mounted decently.

SUMMARY OF THE INVENTION

Accordingly, it is an object of the present invention to ensure that when a shock is applied to the switch, damage to the switch is suppressed to a minimum, and the alignment of the opening in the roof lining and the switch mounting bracket is easily performed.

To achieve the above object, according to a first aspect and feature of the present invention, there is provided a switch mounting structure in a vehicle, comprising a switch mounting bracket which is fixed to a roof lining extending along a lower surface of a roof panel of the vehicle such that the switch mounting bracket is accommodated in a space defined between the roof panel and the roof lining, and a switch inserted through an opening defined in the roof lining and supported on the switch mounting bracket.

With the above arrangement, the switch mounting bracket supporting the switch thereon is accommodated in the space defined between the roof panel and the roof lining in a state in which it has been fixed to the roof lining. Therefore, when a shock is applied from a side of the vehicle compartment to the switch, the switch can be moved within the space, while deforming the roof lining, whereby any damage to the switch due to the shock can be suppressed to the minimum. When the switch mounting bracket is fixed to the roof panel, it is difficult to align the switch mounting bracket and the opening in the roof lining with each other. However, the switch mounting bracket and the opening can be easily aligned with each other by fixing the switch mounting bracket to the roof lining.

According to a second aspect and feature of the present invention, in addition to the first feature, the switch mounting bracket comprises a bottom plate, a pair of legs extending in the same direction from opposite ends of the bottom plate, and a pair of flanges which are formed by folding tip ends of the pair of legs substantially in parallel to the bottom plate, and which are fixed to an upper surface of the roof lining.

With the above arrangement, the switch mounting bracket is fixed to the roof lining by the pair of flanges simply formed by folding the tip ends of the pair of legs. Therefore, the switch mounting bracket supporting the switch thereon can be easily accommodated in the space defined between the roof panel and the roof lining.

According to a third aspect and feature of the present invention, in addition to the second feature, the switch is fixed to the pair of flanges.

With the above arrangement, when a large shock is applied to the switch, causing the bottom plate of the switch mounting bracket to be put into abutment against the roof panel, the pair of legs are deformed so as to be folded relative to the bottom plate by the shock transmitted from the flanges of the switch mounting bracket to the pair of legs. Therefore, the switch can be further moved relative to the switch mounting bracket, thereby exhibiting a further shock absorbing effect.

According to a fourth aspect and feature of the present invention, in addition to the third feature, the switch is fixed to the switch mounting bracket by bringing locking claws provided on the switch into engagement with locking bores defined in the flanges of the switch mounting bracket.

With the above arrangement, when the switch is mounted to the switch mounting bracket, the pair of legs is resiliently deformed, causing the flanges to be moved toward and away from each other. Therefore, the operation for bringing the locking claws provided on the switch into engagement with the locking bores provided in the flanges is easily carried out.

According to a fifth aspect and feature of the present invention, in addition to the third feature, a peripheral edge portion of the opening in the roof lining is clamped between the flanges of the switch mounting bracket and the switch.

With the above arrangement, the peripheral edge portion of the opening in the roof lining can be made invisible to enhance the external appearance thereof, by clamping the peripheral edge portion of the opening between the flanges of the switch mounting bracket and the switch.

According to a sixth aspect and feature of the present invention, in addition to the second feature, the flanges of the switch mounting bracket are fixed to the upper surface of the roof lining with adhesive.

With the above arrangement, the adhesion is released by a shock applied to the switch, causing the flanges of the switch mounting bracket to be separated from the roof lining. Therefore, the legs are easily folded relative to the bottom plate, leading to a further enhanced shock-absorbing effect.

According to a seventh aspect and feature of the present invention, in addition to the second feature, the switch mounting bracket comprises two pairs of legs extending in the same direction from four sides of the bottom plate which is quadrilateral in shape, and two pairs of flanges formed by folding the tip ends of the two pairs of legs substantially in parallel to the bottom plate, the two pairs of flanges being fixed to the upper surface of the roof lining.

With the above arrangement, the switch mounting bracket is fixed to the upper surface of the roof lining through the two pairs of legs and the two pairs of flanges. Therefore, it is possible to easily fix the switch mounting bracket in a stable state.

The above and other objects, features and advantages of the invention will become apparent from the following description of the presently preferred embodiment taken in conjunction with the accompanying drawings.

BRIEF DESCRIPTION OF THE DRAWINGS

FIGS. 1 to 4 show the preferred embodiment of the present invention, wherein,

DETAILED DESCRIPTION OF THE PREFERRED EMBODIMENT

The present invention will now be described by way of the preferred embodiment with reference to the accompanying drawings.

Figure 1:
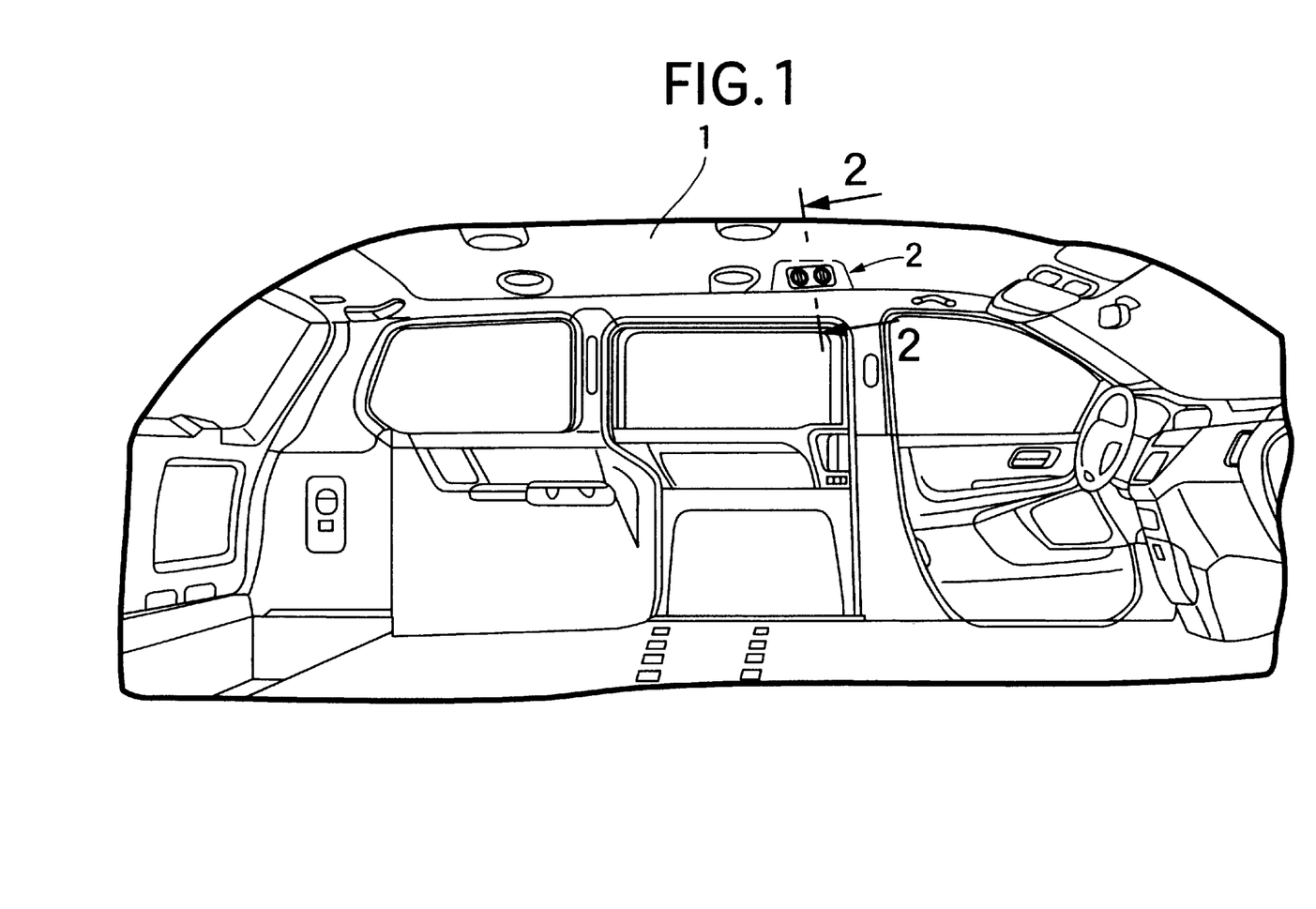
FIG. 1 is a perspective view showing the inside passenger compartment in a vehicle.

FIG. 1 shows an inside of a vehicle compartment in a recreational vehicle. An air conditioner switch unit 2 for operating an air conditioner by an occupant siting on a rear seat is mounted at a step formed on a roof lining 1.

Figure 2:
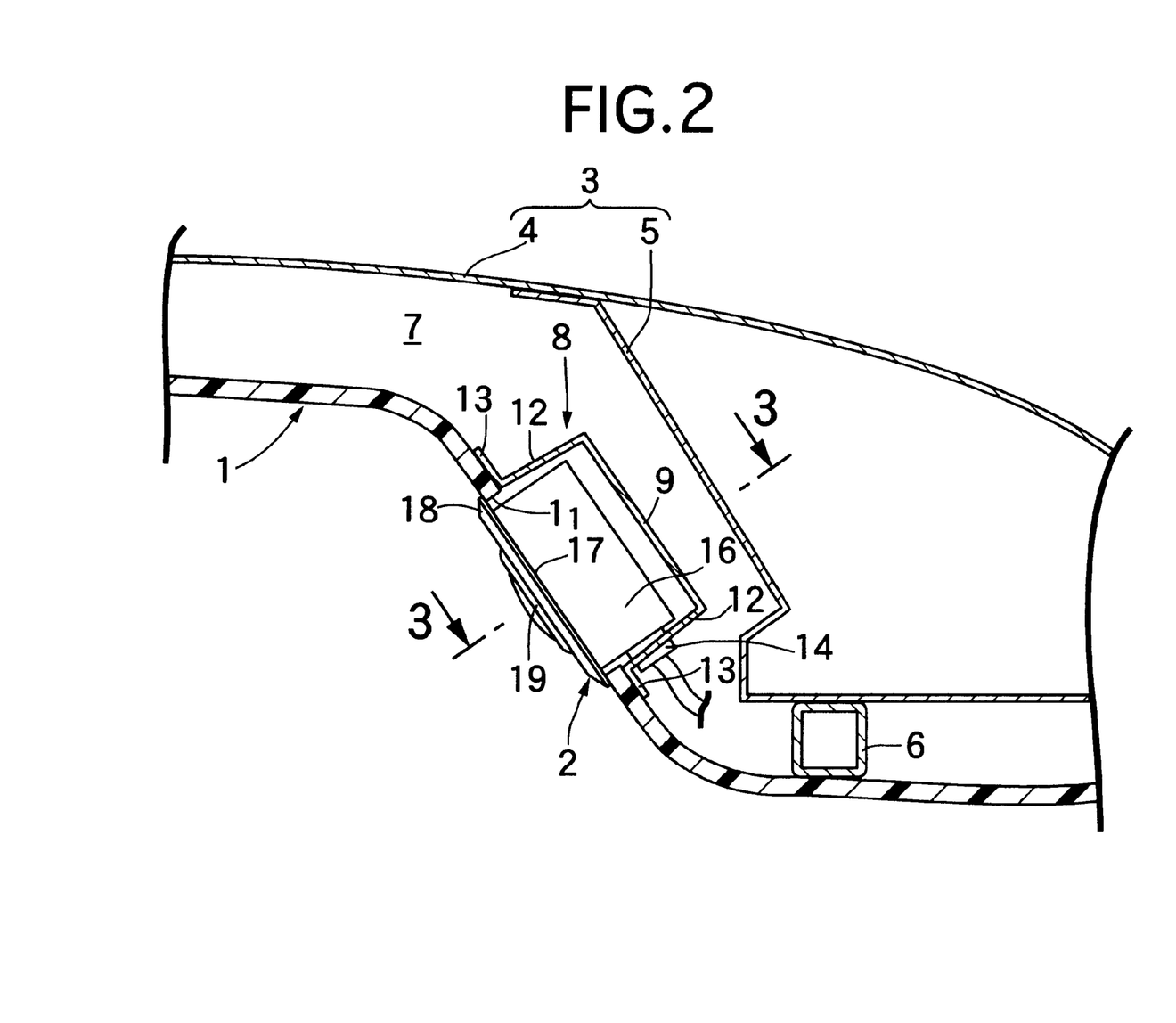
FIG. 2 is an enlarged sectional view taken along a line 2—2 in FIG. 1.
Figure 3:
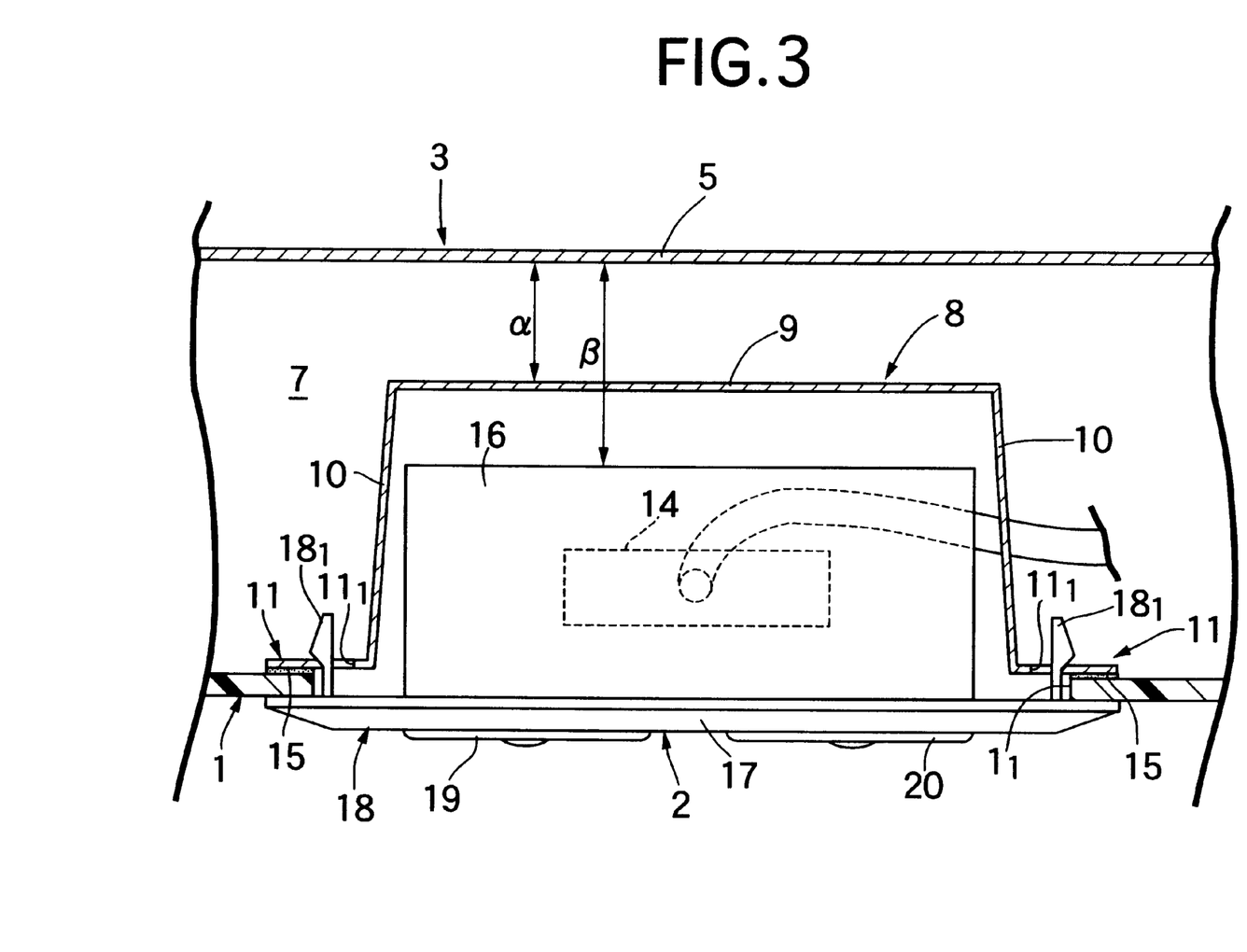
FIG. 3 is a sectional view taken along a line 3—3 in FIG. 2.

As can be seen from FIGS. 2 and 3, a roof panel 3 of the vehicle is comprised of a roof top panel element 4 covering an upper surface of the vehicle compartment, and a roof side panel element 5 welded to lower surfaces of left and right sides of the roof top panel element 4. The roof lining 1 is supported on a lower surface of the roof side panel element 5 through a support member 6 interposed therebetween. Therefore, a predetermined space 7 is defined between the roof lining 1 and the roof panel 3.

Figure 4:
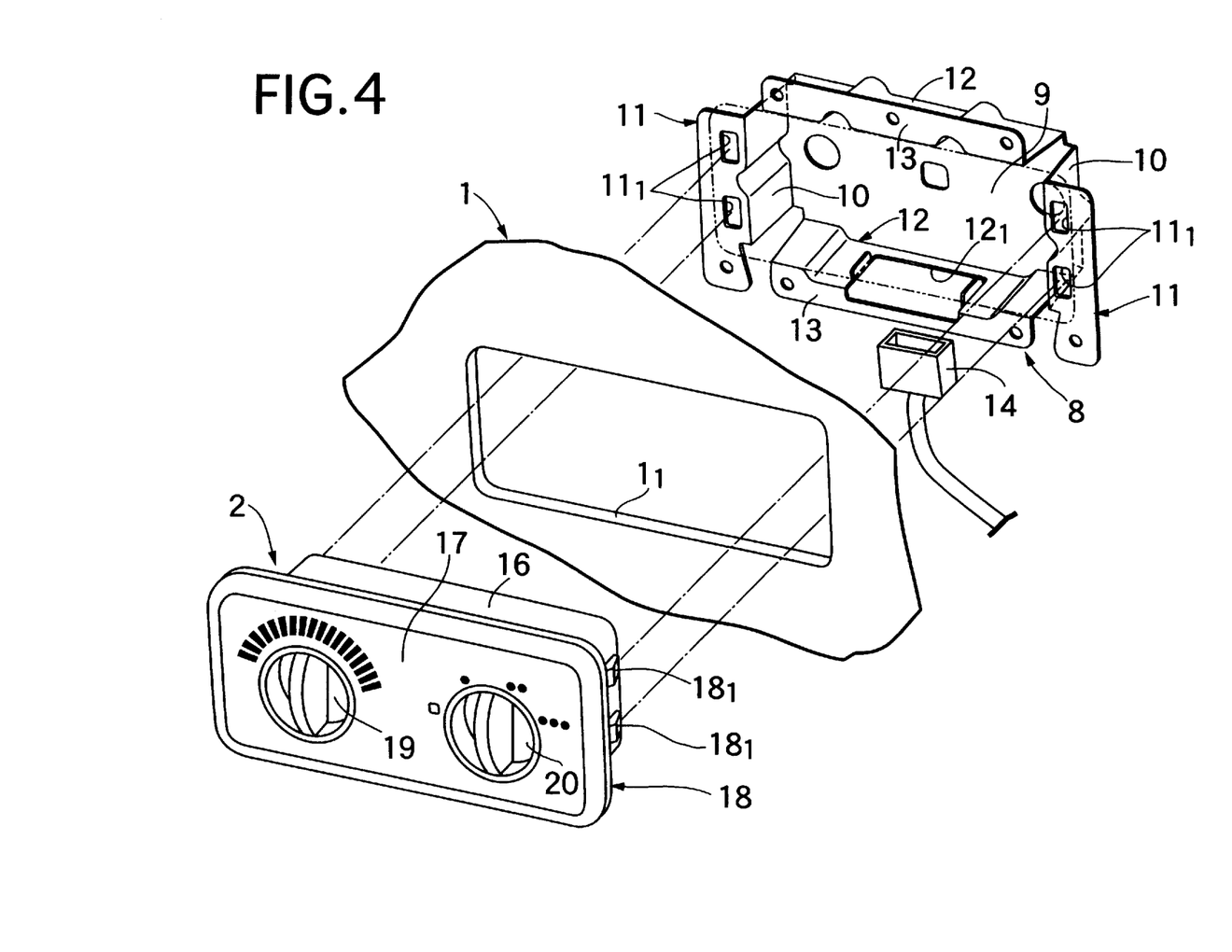
FIG. 4 is an exploded perspective view of a switch and a switch mounting bracket.

As can be seen from FIG. 4 in addition to FIGS. 1 to 3, a switch mounting bracket 8 is made, for example, by pressing a metal plate, and integrally includes a substantially rectangular bottom plate 9, a pair of first legs 10 formed by folding longitudinally opposite ends of the bottom plate 9 at right angles, a pair of flanges 11 formed by folding tip ends of the first legs 10 at right angles, a pair of second legs 12 formed by folding widthwise opposite ends of the bottom plate 9 at right angles, and a pair of second flanges 13 formed by folding tip ends of the second legs 12 at right angles. Two locking bores $11_1$ are defined in each of the first flanges 11, and an opening $12_1$ for insertion of a connector 14 is defined in one of the second legs 12.

The first legs 10 and the second legs 12 are independent and are not connected to each other and hence they can be easily deformed when a load is applied to the first flanges 11 or the second flanges 13 which are farther from a connection to the bottom plate 9.

The switch mounting bracket 8 is of a recessed, vessel-shape defined by the bottom plate 9 and the four legs 10 and 12, and the four flanges 11 and 13 surrounding an opening in a lower surface of the switch mounting bracket 8 are located on the same plane. The four flanges 11 and 13 of the switch mounting bracket 8 are preferably fixed by an adhesive 15 (see FIG. 3) to an upper surface of an outer periphery of a rectangular switch mounting opening 11 defined in the roof lining 1. In this state, the bottom plate 9 of the switch mounting bracket 8 is opposed to the switch mounting opening 11 of the roof lining 1.

The air conditioner switch unit 2 includes a rectangular parallelepiped-shaped switch body 16, a switch panel 17 constituting one side of the switch body 16, a flange 18 protruding outwards from an outer periphery of the switch panel 17, and a temperature regulating knob 19 and an airflow regulating knob 20 which are carried on the switch panel 17. When the switch body 16 of the air conditioner switch unit 2 is inserted from the switch mounting opening $1_1$ in the roof lining 1, the switch body 16 is accommodated in the internal space in the switch mounting bracket 8 and at the same time, four locking claws $18_1$ projectingly formed on a back of the flange 18 are brought into engagement into the four locking bores $11_1$ defined in the first flanges 11 of the switch mounting bracket 8, whereby the air conditioner switch unit 2 is supported on the switch mounting bracket 8. As shown in FIG. 3, the projecting ends of the locking claws $18_1$ are tapered such that they are wider at intermediate portions of the claws, which causes the flanges 11 to flex away from and toward each other as the switch unit 2 is secured to the bracket 8.

In a state in which the air conditioner switch unit 2 has been supported on the switch mounting bracket 8, a peripheral edge of the switch mounting opening 11 in the roof lining 1 is sandwiched between the four flanges 11 and 13 of the switch mounting bracket 8 and the flange 18 of the air conditioner switch unit 2 and hence, the switch mounting opening $1_1$ is not visible, leading to an enhanced external appearance. In addition, a clearance α is defined between the bottom plate 9 of the switch mounting bracket 8 and the roof side panel element 5 of the roof panel 3, and a clearance β larger than the clearance α is defined between the air conditioner switch unit 2 and the roof side panel element 5 (see FIG. 3).

The operation of the embodiment of the present invention having the above-described arrangement will be described below.

The switch mounting bracket 8 supporting the air conditioner switch unit 2 is not supported on the rigid roof panel 3, but is supported on the roof lining 1 which is much more easily deformable, as compared with the roof panel 3. Therefore, when a large piece of baggage or a longer piece of baggage loaded in the vehicle compartment collides with the air conditioner switch unit 2 to apply a shock, the air conditioner switch unit 2 can be moved a significant distance until the bottom plate 9 of the switch mounting bracket 8 abuts against the lower surface of the roof panel 3, i.e., within a range shown by the clearance α in FIG. 3 to substantially absorb the shock. Thus, the shock is moderated to prevent damage to the air conditioner switch unit 2.

When a larger shock is applied to cause the bottom plate 9 of the switch mounting bracket 8 to be put into abutment against the lower surface of the roof panel 3, the flanges 11 and 13 of the switch mounting bracket 8 adhesively bonded at 15 to the roof lining 1 are separated from the roof lining 1, and the legs 10 and 12 of the switch mounting bracket 8 are deformed by a load transmitted from the flange 18 of the air conditioner switch unit 2, thereby exhibiting a further shock absorbing effect. In this case, a sufficiently large shock absorbing stroke corresponding to the clearance β is ensured between the air conditioner switch unit 2 and the roof panel 3.

With the structure in which the switch mounting bracket 8 is supported on the deformable roof lining 1, and the legs 10 and 12 of the switch mounting bracket 8 are easily deformable, as described above, even a large shock applied to the air conditioner switch unit 2 can be buffered to avoid a damage to the air conditioner switch unit 2.

If it is supposed that the switch mounting bracket 8 has been fixed to the roof panel 3, there is a possibility that a misalignment may be produced between the switch mounting bracket 8 and the switch mounting opening $1_1$ in the roof lining 1 due to an error of the fixed portion or the like, thereby providing an interference when the air conditioner switch unit 2 is mounted in the switch mounting opening $1_1$. According to the present embodiment, however, the switch mounting bracket 8 is fixed directly along the switch mounting opening 11 in the roof lining 1 and hence, there is no possibility that the switch mounting bracket 8 is misaligned relative to the switch mounting opening 11.

Further, the locking bores $11_1$ are defined in the first flanges 11 at the tip ends of the pair of first legs 10 and, therefore, when the locking claws $18_1$ are brought into engagement into the locking bores 111, the pair of first legs 10 can be resiliently deformed toward and away from each other by engagement with the tapered portions of the claws, to easily perform the engaging operation.

Yet further, the flanges 11 and 13 of the switch mounting bracket 8 and the roof lining 1 are fixed by the adhesive 15 and, therefore, when the shock is applied, the switch mounting bracket 8 can be reliably separated from the roof lining 1. Moreover, the fixing portion can be made compact, as compared with the case where the flanges 11 and 13 are fixed to the roof lining 1 by caulking. Therefore, it is unnecessary to increase the size of the flange 18 of the air conditioner switch unit 2 in order to cover and hide the fixing portion, which can be contributed to a reduction in size of the air conditioner unit 2.

Although the preferred embodiment of the present invention has been described in detail, it will be understood that the present invention is not limited to the above-described embodiment, and various modifications may be made without departing from the spirit and scope of the invention defined in claims.

For example, among the first legs 10 and the second legs 12 of the switch mounting bracket 8, the second legs 12 which do not support the air conditioner switch unit 2 directly may be omitted. The air conditioner switch unit 2 has been illustrated in the embodiment, but the present invention is also applicable to any other switch.

What is claimed is:

1. A switch mounting structure in a vehicle, comprising a switch mounting bracket, a roof lining extending along a lower surface of a roof panel of the vehicle, said mounting bracket being fixed to said roof lining such that said switch mounting bracket is accommodated in a space defined between said roof panel and said roof lining, and a switch inserted through an opening defined in said roof lining and supported on said switch mounting bracket;

said switch mounting bracket comprising a bottom plate, a pair of legs extending in the same direction from opposite ends of said bottom plate, and a pair of flanges which are formed by folding tip ends of said pair of legs substantially parallel to said bottom plate, and which are fixed to an upper surface of said roof lining;

said legs being resiliently deformable toward and away from each other; and said switch being fixed to said pair of flanges.

2. A switch mounting structure in a vehicle according to claim 1, wherein said switch has locking claws provided thereon and is fixed to said switch mounting bracket by bringing said locking claws into engagement with locking bores defined in said flanges of said switch mounting bracket.

3. A switch mounting structure in a vehicle according to claim 1, wherein a peripheral edge portion of said opening in said roof lining is clamped between said flanges of said switch mounting bracket and said switch.

4. A switch mounting structure in a vehicle according to claim 1, wherein said flanges of said switch mounting bracket are fixed to the upper surface of said roof lining with adhesive.

5. A switch mounting structure in a vehicle, comprising a switch mounting bracket, a roof lining extending along a lower surface of a roof panel of the vehicle, said mounting bracket being fixed to said roof lining such that said switch mounting bracket is accommodated in a space defined between said roof panel and said roof lining, and a switch inserted through an opening defined in said roof lining and supported on said switch mounting bracket;

said switch mounting bracket comprising a bottom plate, a pair of legs extending in the same direction from opposite ends of said bottom plate, and a pair of flanges which are formed by folding tip ends of said pair of legs substantially parallel to said bottom plate, and which are fixed to an upper surface of said roof lining;

said switch being fixed to said pair of flanges;

said switch having locking claws provided thereon and being fixed to said switch mounting bracket by bringing said locking claws into engagement with locking bores defined in said flanges of said switch mounting bracket; and said legs being independent of each other and resiliently deformable toward and away from each other, and said locking claws having tapered portions which deform said legs toward and away from each other when said claws are inserted into said locking bores.

6. A switch mounting structure in a vehicle, comprising:

a roof lining extending along a lower surface of a roof panel of the vehicle and having an opening defined therein;

switch mounting means for securing a switch in the opening of the roof lining, said switch mounting means being fixed to said roof lining and disposed in a space between said roof lining and the roof panel;

a switch body of the switch inserted into the opening of the roof lining and connected to said switch mounting means;

said switch mounting means including a recessed bracket with a bottom plate, a pair of side walls extending from opposite edges of the bottom wall and having flanges on tip ends thereof, said flanges being fixed to an upper surface of said roof lining;

said side walls of said bracket are flexibly deformable toward and away from each other; and said switch body being fixed to said flanges.

7. A switch mounting structure in a vehicle according to claim 6, wherein said flanges are fixed to a peripheral edge portion of said roof lining defining said opening.

8. A switch mounting structure in a vehicle according to claim 7, wherein said flanges are fixed to the upper surface of said roof lining with adhesive.

9. A switch mounting structure in a vehicle according to claim 7, wherein said peripheral edge portion of said roof lining is clamped between said flanges of said switch mounting bracket and said switch body.

10. A switch mounting structure in a vehicle according to claim 7, wherein said bracket comprises two pairs of side walls extending in the same direction from four sides of the bottom plate which is quadrilateral in shape, and flanges formed at the tip ends of said two pairs of side walls substantially parallel to said bottom plate, said flanges being fixed to the upper surface of said roof lining.

11. A switch mounting structure in a vehicle, comprising:
- a roof lining extending along a lower surface of a roof panel of the vehicle and having an opening defined therein;
- switch mounting means for securing a switch in the opening of the roof lining, said switch mounting means being fixed to said roof lining and disposed in a space between said roof lining and the roof panel;
- a switch body of the switch inserted into the opening of the roof lining and connected to said switch mounting means;
- said switch mounting means including a recessed bracket with a bottom plate, a pair of side walls extending from opposite edges of the bottom wall and having flanges on tip ends thereof, said flanges being fixed to an upper surface of said roof lining;
- said switch body being fixed to said flanges;
- said switch body having locking claws provided thereon, said flanges having locking bores defined therein, and said switch body being fixed to said bracket by bringing said locking claws into engagement with said locking bores; and
- said side walls being resiliently deformable toward and away from each other, and said locking claws having tapered portions which deform said legs toward and away from each other when said claws are inserted into said locking bores.

12. A switch mounting structure in a vehicle, comprising:
- a switch mounting bracket;
- a roof lining extending along a lower surface of a roof panel of the vehicle, said switch mounting bracket being fixed to said roof lining such that said switch mounting bracket is accommodated in a space defined between said roof panel and said roof lining with a first clearance ($\alpha$) provided between said mounting bracket and said lower surface of said roof panel; and
- a switch inserted through an opening defined in said roof lining and supported on said switch mounting bracket with a second clearance ($\beta$) provided between said switch and said lower surface of the roof panel, wherein said second clearance ($\beta$) is larger than said first clearance ($\alpha$).

13. A switch mounting structure in a vehicle according to claim 12, wherein when a shock is applied to said switch in a direction of said roof panel, said switch is movable within a range corresponding to said first clearance ($\alpha$) until said mounting bracket abuts against said roof panel, for thereby absorbing said shock.

14. A switch mounting structure in a vehicle according to claim 13, wherein said switch mounting bracket comprises a bottom plate, a pair of legs extending in the same direction from opposite ends of said bottom plate, and a pair of flanges which are formed as tip ends of said pair of legs extending in parallel to said bottom plate, and which are adhesively bonded to an upper surface of said roof lining; and
- when a larger shock is applied to said switch such that the mounting plate abuts against said roof panel, said flanges are separated from said roof lining and said pair of legs of said mounting bracket are deformed by a load transmitted from said switch, thereby further absorbing said larger shock.

\* \* \* \* \*

UNITED STATES PATENT AND TRADEMARK OFFICE
CERTIFICATE OF CORRECTION

PATENT NO.    : 6,158,802
DATED         : December 12, 2000
INVENTOR(S)   : Hiroomi Akagi, Tatsuo Matsuura Page 1 of 1

It is certified that error appears in the above-identified patent and that said Letters Patent is hereby corrected as shown below:

<u>Column 4,</u>
Line 2, change "opening 11" to -- opening $1_1$ --;
Line 5, change "opening 11" to -- opening $1_1$ --;
Line 28, change "opening 11" to -- opening $1_1$ --;

<u>Column 5,</u>
Line 16, change "opening 11" to -- opening $1_1$ --;
Line 18, change "opening 11" to -- opening $1_1$ --;
Line 22, change "bores 111" to -- bores $11_1$ --.

Signed and Sealed this

Second Day of October, 2001

*Attest:*

*Attesting Officer*

NICHOLAS P. GODICI
*Acting Director of the United States Patent and Trademark Office*